(12) United States Patent
Bivens et al.

(10) Patent No.: US 7,542,864 B2
(45) Date of Patent: Jun. 2, 2009

(54) SYSTEM AND METHOD FOR MEASURING MATERIAL ADDED TO A VESSEL UNDER A VACUUM

(75) Inventors: Jason D. Bivens, Duncan, OK (US); John G. Heaton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 240 days.

(21) Appl. No.: 11/122,853

(22) Filed: May 5, 2005

(65) Prior Publication Data

US 2005/0207269 A1 Sep. 22, 2005

Related U.S. Application Data

(62) Division of application No. 10/757,860, filed on Jan. 15, 2004, now Pat. No. 6,980,914.

(51) Int. Cl.
*B01F 15/04* (2006.01)
(52) U.S. Cl. ..................... 702/101
(58) Field of Classification Search ............... 702/101, 702/129, 173; 177/25.11; 356/228; 700/305
See application file for complete search history.

(56) References Cited

U.S. PATENT DOCUMENTS

| | | | | |
|---|---|---|---|---|
| 4,474,063 A | 10/1984 | Krueger | ............... | 73/302 |
| 4,627,506 A | 12/1986 | Veng | ............... | 177/25 |
| 4,819,183 A | 4/1989 | O'Brien et al. | ............... | 364/509 |
| 5,004,400 A | 4/1991 | Handke | ............... | 414/786 |
| 5,005,408 A | 4/1991 | Glassey | ............... | 73/301 |
| 5,027,267 A | 6/1991 | Pitts et al. | ............... | 364/172 |
| 5,102,281 A | 4/1992 | Handke | ............... | 414/296 |
| 5,174,320 A | 12/1992 | Allen | ............... | 137/1 |
| 5,245,869 A | 9/1993 | Clarke et al. | ............... | 73/149 |
| 5,538,286 A | 7/1996 | Hoff | ............... | 280/837 |
| 5,802,859 A * | 9/1998 | Zugibe | ............... | 62/125 |

FOREIGN PATENT DOCUMENTS

| | | |
|---|---|---|
| JP | 56166339 | 12/1981 |
| JP | 59212723 | 12/1984 |

OTHER PUBLICATIONS

Foreign communication from a related counterpart application dated Apr. 6, 2005.

* cited by examiner

*Primary Examiner*—Tung S Lau
(74) *Attorney, Agent, or Firm*—John W. Wustenberg; Baker Botts, LLP

(57) ABSTRACT

The present invention relates generally to weight measurement methods and systems, and more specifically, to weight measurement methods and systems for material in a dynamic vacuum material transfer or other system utilizing differential conveying fluid pressure. The invention determines a corrected weight of a batching tank. The invention includes measuring and logging weights and pressures while the batching tank is being evacuated and determining the density of the air in the batching tank at one or more pressures. While material is being transferred into the vessel the invention measures the weight and pressure of the batching tank and calculates the corrected weight based on logged weights, logged pressures, and the density of the material added to the batching tank.

6 Claims, 10 Drawing Sheets

SYSTEM AND METHOD FOR MEASURING MATERIAL ADDED TO A VESSEL UNDER A VACUUM

CROSS-REFERENCE TO RELATED APPLICATION

This application is a divisional of application Ser. No. 10/757,860 filed Jan. 15, 2004 now U.S. Pat. No. 6,980,914.

BACKGROUND

The present invention relates generally to weight measurement methods and systems, and more specifically, to weight measurement methods and systems for material in a dynamic vacuum material transfer or other system utilizing differential conveying fluid pressure.

Shown in FIG. 1 is an example of a dynamic vacuum bulk material transfer system. Before the batching tank 110 is evacuated, the system operator zeros a weight measurement device 120 that measures the weight of the batching tank 110. A vacuum pump 130 is attached to batching tank 110 and activated to create a vacuum. After the tank is suitably evacuated, the operator causes material from one or more of the storage tanks $105_{1 \ldots N}$ to be delivered to batching tank 110 by opening a corresponding one of the valves $125_{1 \ldots N}$. The vacuum pump 130 creates a pressure difference in the system. Materials are transferred from one of the storage tanks $105_{1 \ldots N}$ to the batching tank 110 by air currents caused by the pressure difference in the system. After the weight of the batching tank 110 has reached a desired weight the operator will cause the flow of material from the one of the storage tanks $105_{1 \ldots N}$ to cease by closing the corresponding one of the valves $125_{1 \ldots N}$. The operator may continue to add materials to the batching tank 110 from the storage tanks $105_{1 \ldots N}$, delivering a desired amount of each material to the batching tank. Thereafter, the operator will shut off the vacuum pump 130. The operator will also cause the material in the batching tank 110 to be transferred to the destination vessel 115.

The method described above may cause an inaccurate amount of material to be delivered to the batching tank 110. This is because the weight measurement device 120 is zeroed before the tank is evacuated. While the batching tank 110 is evacuated, air is removed, lowering the weight of the batching tank 110. As material is transferred to the batching tank 110, the material fills some volume. As this volume transferred approaches the volume of the batching tank 110, the weight of the batching tank 110 and the material in the batching tank 110 approach their weight at atmospheric pressure. During filling, however, the weight reported by the weight measurement device 120 is the weight of the material in the vacuum, and not the weight of the material at atmospheric pressure. Therefore, there is a discrepancy in the measured weight of the material during dynamic vacuum material transfer and the measured weight of the material at atmospheric pressure.

When the operator fills the batching tank 110 with material, he/she will fill the tank until the scale reads the amount of material that is desired in the tank. The reading of the weight measurement device, however, reflects not only the weight of the material in the tank, but also the difference between the amount of air initially in the tank and the amount of air in the evacuated tank. If the batching tank 110 has a large volume, the vacuum may decrease the weight on the scale dramatically. This process may lead to inaccurate measurement of material in the batching tank 110. For example, oilfield cement is mixed in a large batching tank 110, so that the weight difference between an evacuated batching tank 110 and unevacuated one may amount to hundreds of pounds.

One way to obtaining the weight of the batching tank 110 at atmospheric pressure involves venting the tank. The batching tank 110 may be vented after each material is added to determine the weight of the batching tank 110 at atmospheric pressure. A drawback of this approach is that significant time is spent venting and then re-evacuating the tank.

Another way of obtaining a more accurate weight of the batching tank 110 involves the use of a flow meter. If a flow meter is inserted between the storage tanks $105_{1 \ldots N}$ and the batching tank 110, the volume of material transferred can be measured. If the density of the material is known, the weight of the material transferred to the batching tank 110 can be calculated. However, in dry material transfer, a flow meter will tend to either block the passage between the storage tanks $105_{1 \ldots N}$ and the batching tank 110, or the flow meter may be destroyed by the material while it passes though the flow meter.

SUMMARY

The present invention relates generally to weight measurement methods and systems, and more specifically, to weight measurement methods and systems for material in a dynamic vacuum material transfer or other system utilizing differential conveying fluid pressure.

One embodiment of the present invention includes a method for determining a corrected weight of a batching tank. The batching tank is adapted to receive one or more materials, each material having a density. The batching tank has a weight, a pressure, and a volume. The batching tank initially includes a fluid having a density. The method includes: measuring one or more first weights of the batching tank, wherein the first weights are determined while the fluid is removed from the batching tank; logging the first weights; measuring one or more first pressures in the batching tank, wherein each first pressure is determined substantially simultaneously with the determination of a first weight; logging the first pressures; measuring one or more second weights of the batching tank, wherein each second weight is measured while a material is transferred into the batching tank; measuring one or more second pressures in the batching tank, wherein each second pressure is measured substantially simultaneously with the measurement of each second weight; and determining a corrected weight of the batching tank based on one of the second weights, one of the second pressures, one or more first weights, one or more first pressures, the density of the material being transferred to the batching tank, and the density of the fluid.

Another embodiment of the present invention includes a method for transferring material to a batching tank. The material has a density. The batching tank has a weight, a pressure, and a volume. The batching tank initially includes a fluid having a density. The method includes: removing fluid from the batching tank; measuring one or more first weights of the batching tank, wherein the first weights are determined while the fluid is removed from the batching tank; logging the first weights; measuring one or more first pressures in the batching tank, wherein each first pressure is measured substantially simultaneously with the measurement of the first weight; logging the first pressures; transferring a material to the batching tank; measuring a second weight of the batching tank, wherein the second weight is measured while the material is being transferred into the batching tank; measuring a second pressure in the batching tank, wherein the second pressure is measured substantially simultaneously with the measurement of each second weight; and determining a corrected weight of the batching tank based on the second weight, the second pressure, one or more first weights, one or more first pressures, and one or more material properties.

Another embodiment of the present invention includes a material transfer system capable of transferring a material to a batching tank. The batching tank has a weight, a pressure, and a volume. The batching tank initially includes a fluid. The fluid has a density. The material has a density. The system includes: a vacuum pump, the vacuum pump removeably connected to the batching tank and operable to remove fluid from the batching tank; a weight measurement device operable to measure one or more first weights of the batching tank and a second weight of the batching tank, the weight measurement device having an output; a pressure measurement device operable to measure one or more first pressures in the batching tank and a second pressure in the batching tank, the pressure measurement device having an output; one or more valves for allowing the material to enter the batching tank, each valve having a control input; and a control unit in communication with to the output of the weight measurement device and the output of the pressure measurement device, the control unit operable to record one or more first weights measured by the weight measurement device and one or more first pressures measured by the pressure measurement device, the control unit operable to determine a corrected weight.

The features and advantages of the present invention will be readily apparent to those skilled in the art upon a reading of the description of the embodiments which follows.

BRIEF DESCRIPTION OF THE DRAWINGS

The present invention is better understood by reading the following description of non-limitative embodiments with reference to the attached drawings wherein like parts of each of the several figures are identified by the same referenced characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION

The present invention relates generally to weight measurement methods and systems, and more specifically, to weight measurement methods and systems for material in a dynamic vacuum material transfer or other system utilizing differential conveying fluid pressure. A desirable feature of the system and method of the present invention is quicker and more accurate measurement of materials transferred in a vacuum transfer material system.

Figure 1:
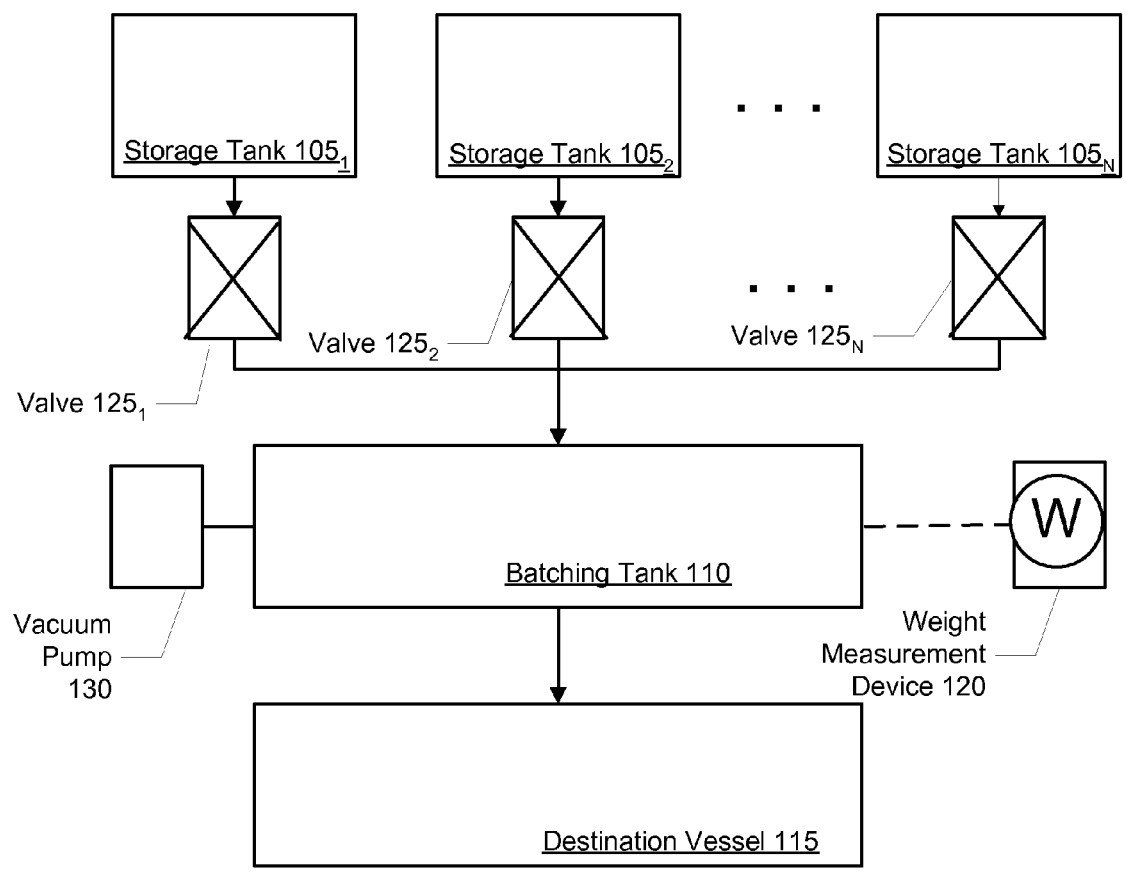
FIG. 1 is a block diagram of a prior art dynamic vacuum bulk material transfer system.
Figure 2:
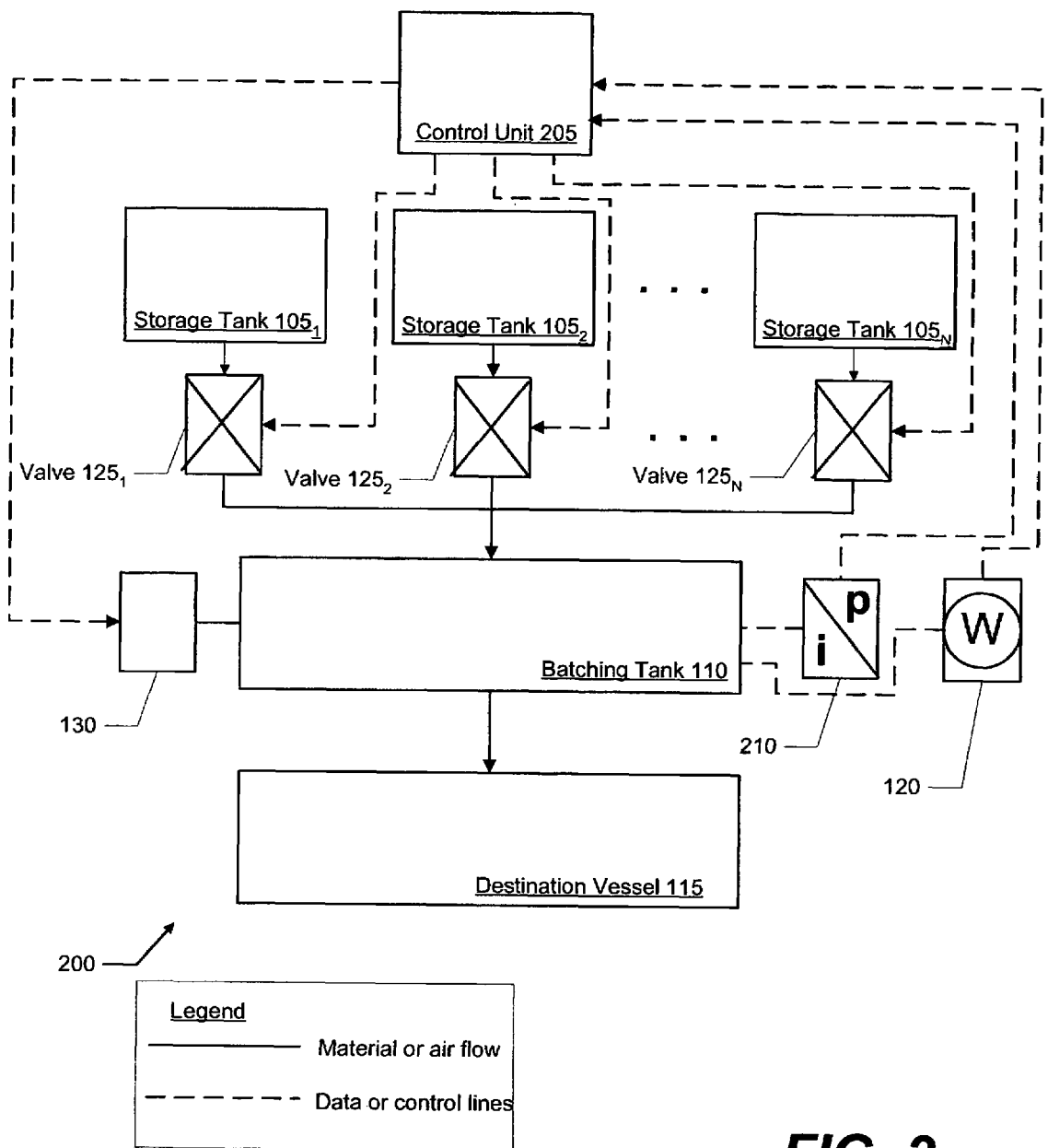
FIG. 2 is a block diagram of a dynamic vacuum bulk material transfer system in accordance with the present invention.

The details of the present invention will now be discussed with reference to the figures. Turning to FIG. 2, a dynamic vacuum material transfer system is shown generally by reference to numeral 200. System 200 comprises one or more storage tanks $105_{1...N}$. Each of the storage tanks $105_{1...N}$ may be of any size or configuration, depending on the application of the system. In one embodiment, the storage tanks are cylinders, preferably having a twelve foot diameter and thirty-two foot height. The storage tanks may be uniform, or they may have different dimensions and configurations. For example, if large quantities of one material are used, one of the storage tanks $105_{1...N}$ holding that material may be larger than the other storage tanks $105_{1...N}$. The storage tanks $105_{1...N}$ may contain materials for use in the system 200. The material may be solid or liquid. The material will have properties, including a density. In one embodiment, the materials stored in the storage tanks are components of oil field cement. In one example of this embodiment, sand, having a density of about 100 lbs/ft$^3$, or asphaltum, such as that sold under the trademark GILSONITE by the American Gilsonite Company of San Francisco, Calif., having a density of about 55 lbs/ft$^3$ may be stored in one of the storage tanks $105_{1...N}$.

The system 200 further comprises one or more valves $125_{1...N}$, each valve corresponding to one of the storage tanks $105_{1...N}$. Each of the valves $125_{1...N}$ is in communication with the corresponding one of the storage tanks $105_{1...N}$. In one embodiment of the present invention each of the valves $125_{1...N}$ is connected to the corresponding storage tank by a pipe or other conduit that allows material to move from the corresponding storage tank to the valve. Each of the valves $125_{1...N}$ is capable of letting material pass or halting the flow of material from the corresponding storage tank. The valves may be controlled by an operator of the system to selectively pass material from the corresponding storage tank. The valves may be controlled manually (e.g., with a lever, knob, or other manual control apparatus) or electronically.

The system 200 further comprises a batching tank 110, which is in communication with, and adapted to receive material from each of the storage tanks $105_{1...N}$ via valves $125_{1...N}$. The batching tank 10 my be connected to the valves $125_{1...N}$ by pipes, hoses, or other conduits suitable for handling the material used in the system 200. The batching tank may be of any size or configuration, depending on the needs of the system. In one embodiment of the present invention, the batching tank 110 may range from 410 ft$^3$ to 1600 ft$^3$ in volume.

The batching tank 110 is adapted to be connected to a vacuum pump 130. The vacuum pump 130 is used to remove a fluid from the batching tank 110. The fluid may be any liquid or gas which is suitable to transport the material in the dynamic vacuum transfer system. In one embodiment the fluid comprises air. The vacuum pump 130 may comprise any apparatus capable of initially lowering the pressure of the batching tank 110 and later maintaining a dynamic vacuum while material is transferred from the storage tanks $105_{1...N}$ to the batching tank 110. The vacuum pump 130 is capable of lowering the pressure in the batching tank 110 sufficiently to cause a pressured differential in the system, causing material to move from the storage tanks $105_{1...N}$ to the batching tank 110. The magnitude of the pressure differential created by the vacuum pump 130 may vary based on the needs and configuration of the system 200. In an exemplary embodiment of the system, the vacuum pump 130 is capable of lowering the pressure in the batching tank 110 to about 5.7 psi (absolute), and maintaining a pressure of about 7.7 psi (absolute) during dynamic vacuum material transfer. The vacuum pump 130 may further comprise a control input for controlling the operation of the vacuum pump 130, including whether the pump 130 is on or off and how much fluid it is evacuating from the batching tank 110.

Figure 3:
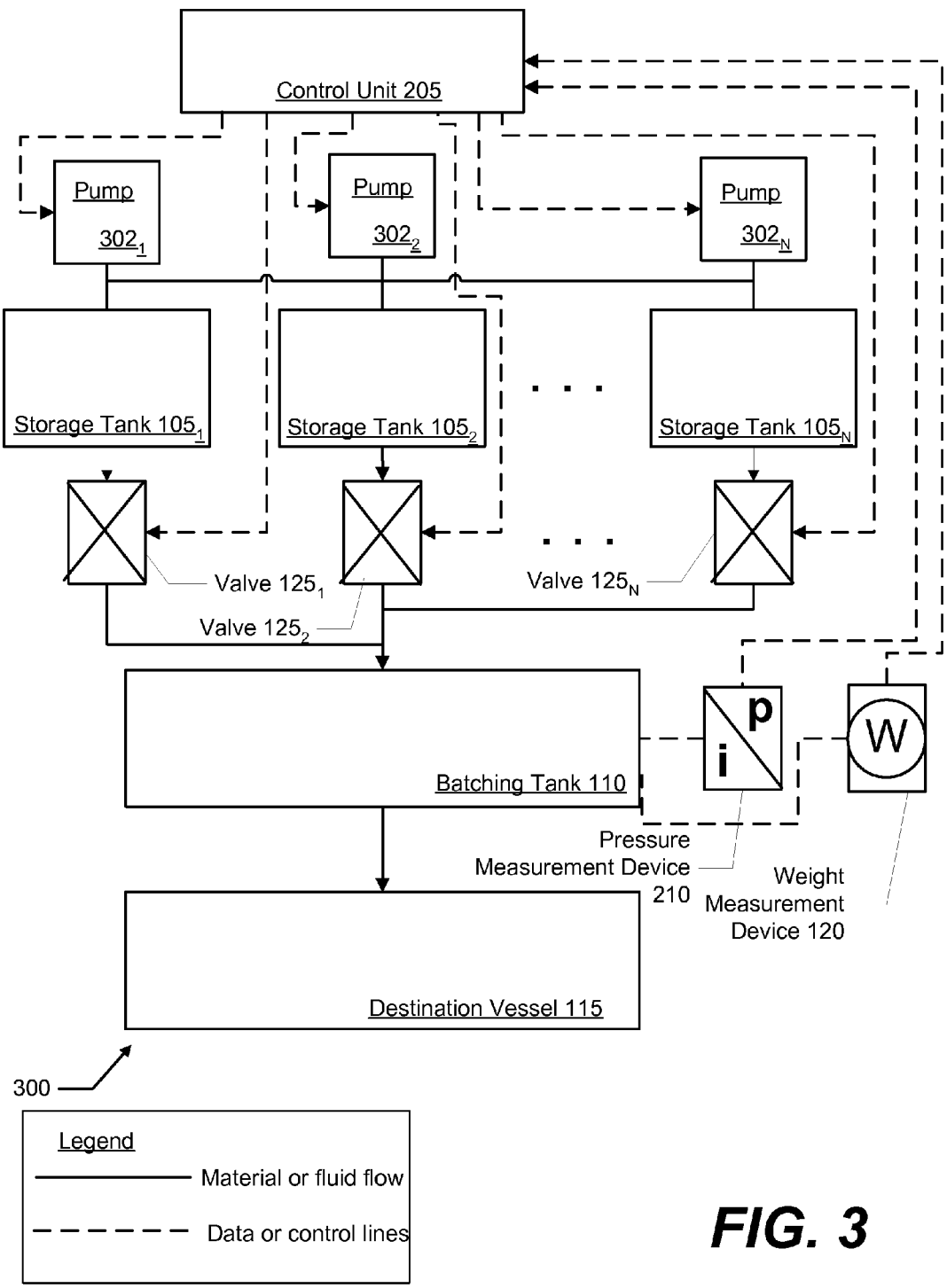
FIG. 3 is a block diagram of a bulk material transfer system in accordance with the present invention.

Turning now to FIG. 3, an alternative embodiment of the system of the present invention, represented generally by the numeral 300, is illustrated. The batching tank 110 of the system 300 may be vented. The system comprises one or more pumps $302_{1 \ldots N}$, each of the one or more pumps $302_{1 \ldots N}$ coupled to one or more of the storage tanks $105_{1 \ldots N}$. Each of the pumps $302_{1 \ldots N}$ may comprise any apparatus capable of initially raising the pressure of the corresponding storage tank $105_{1 \ldots N}$ and later maintaining the pressure while material is transferred from the storage tanks $105_{1 \ldots N}$ to the batching tank 110. Each of the pumps $302_{1 \ldots N}$ may comprise a compressor or a blower. Each of the pumps $302_{1 \ldots N}$ is capable of raising the pressure in one of the storage tanks $105_1 \ldots N$ sufficiently to cause a pressured differential in the system, causing material to move from one of the storage tanks $105_{1 \ldots N}$ to the batching tank 110. The magnitude of the pressure differential created by each of the pumps $302_{1 \ldots N}$ may vary based on the needs and configuration of the system. In another embodiment of the present invention the system comprises only a single pump $302_1$ in communication with all of the storage tanks $105_{1 \ldots N}$.

Returning to FIG. 2, the system 200 further comprises a weight measurement device 120 for measuring a weight of the batching tank 110. The weight measurement device 120 may comprise any apparatus adapted to measure the weight of the batching tank 110. The weight measurement device 120 is in communication with the batching tank 110, such that the weight measurement device 120 can measure the weight of the batching tank 110. In one embodiment, the weight measurement device 120 comprises a load cell, placed beneath the batching tank 110 to measure the weight of the batching tank 110. The weight measurement device 120 has an output for relaying the measured weight.

The system 200 further comprises a pressure measurement device 210 to measure the pressure within the batching tank 110. The pressure measurement device 210 may comprise any apparatus capable of measuring the pressure within the batching tank 110. The pressure measurement device 210 is situated so that it can measure the pressure within the batching tank 110. The pressure measurement device 210 has an output for transmitting the pressure within the batching tank 110.

The system 200 further comprises a control unit 205. The control unit 205 may comprise one or more computers or other apparatuses. The control unit 205 may be in communication with and adapted to control, the valves $125_{1 \ldots N}$ and the vacuum pump 130. The control unit 205 comprises a weight input in communication with the output of the weight measurement device 120 and a pressure input in communication with the output of the pressure measurement device 210. The control unit 205 may be in communication with, and adapted to control, the valves $125_{1 \ldots N}$. The control unit 205 may be in communication with, and adapted to control, the vacuum pump 130. The control unit 205 is capable of receiving inputs from the weight sensor 120 and the pressure sensor 210 and recording the weight and pressure measurements. The control unit 205 may be an integrated computer control system comprising one or more inputs (e.g. keyboard, mouse, input ports for communicating with the weight measurement device 120 and the pressure measurement device 210), one or more outputs (e.g. CRT, LCD, printer, or ports for communicating with the inputs of the valves $125_{1 \ldots N}$), one or more processors, and a memory.

Figure 4:
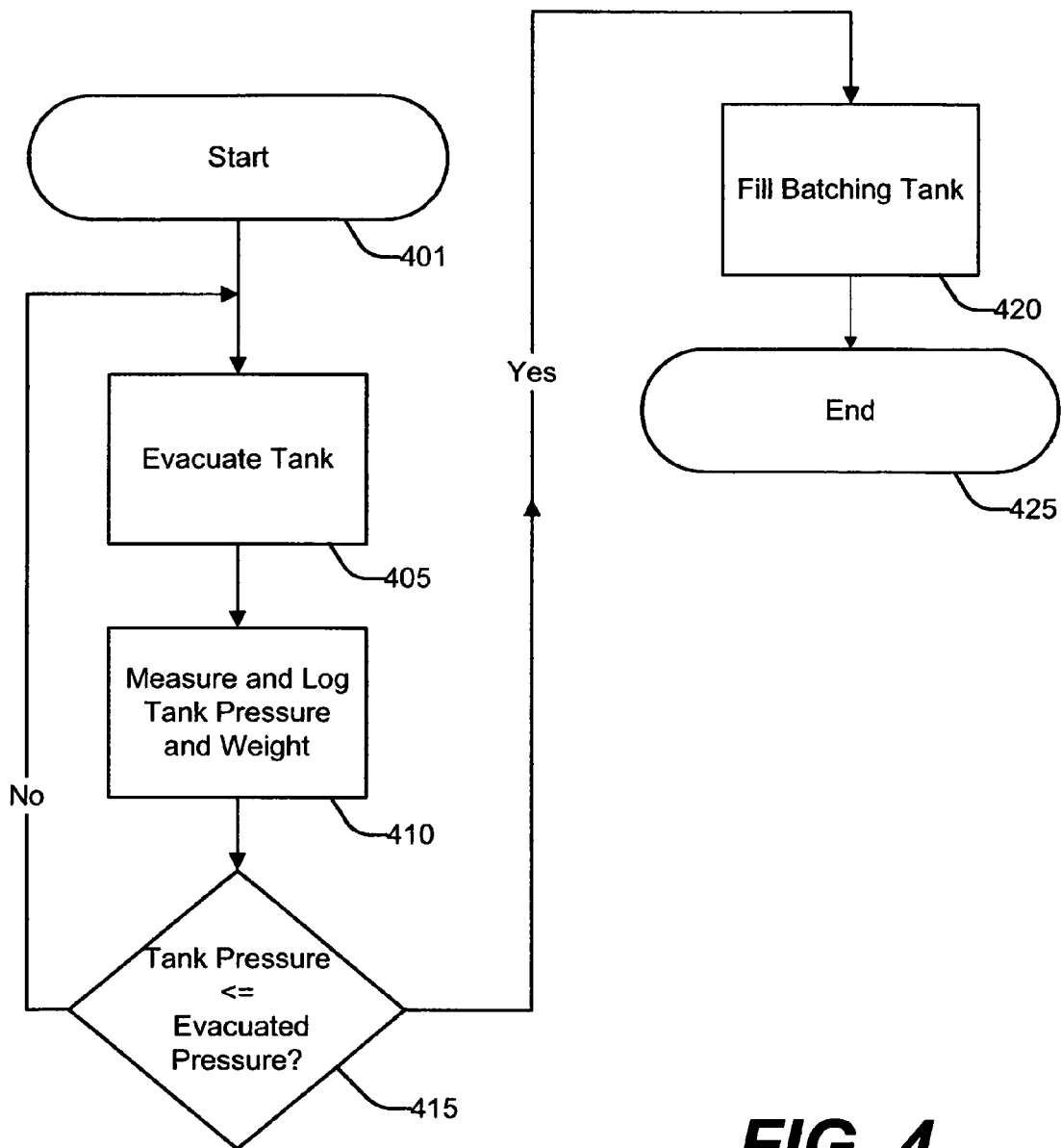
FIG. 4 is a flow chart of a method for dynamic vacuum bulk material transfer in accordance with the present invention.

Referring again to FIG. 3, in system 300 shown in FIG. 4, the control unit 205 is in communication with, and adapted to control the pumps $302_{1 \ldots N}$. If the system 300 comprises only a single pump $302_1$, the control unit is in communication with, and adapted to control the pump $302_1$.

Returning now to FIG. 2, the system 200 further comprises a destination vessel 115. The destination vessel 115 is adapted to receive material from the batching tank 110. The batching tank 110 may comprise a vessel of suitable dimensions and arrangement to hold the material transferred from the batching tank 110. In one embodiment of the present invention, the destination vessel 115 may comprise a truck with a tank or other receptacle for hauling oilfield cement.

Turning now to FIG. 4, a method of operation of the system 200 according to the present invention will be described. The method starts at block 401 and proceeds to block 405, where fluid is removed from the batching tank 110 by the vacuum pump 130, creating a vacuum, and the method then proceeds to block 410. In one embodiment, the control unit 205 causes the vacuum pump 130 to activate.

In block 410, a first pressure of the batching tank 110 and a first weight of the batching tank 110 are measured and these measurements are logged while the batching tank 110 is being evacuated. The method may take continuous readings. Alternatively, the method may only log the pressure and weight of the tank at some time interval, e.g. every second; at some pressure interval, e.g. every time the pressure in the tank drops one psi; or, at some weight interval, e.g. every time the weight of the tank drop one pound. In one embodiment, the control unit 205 records the pressure within the batching tank 110 and the weight of the batching tank 110 every time the pressure within the batching tank 110 drops about one psi. Preferably, each set of corresponding weight and pressure measurements are made substantially simultaneously. After the weight of the batching tank 110 and the pressure in the batching tank 110 are measured and possibly logged the method proceeds to block 415. In block 415, the control unit 205 determines if the tank is suitably evacuated by comparing the first pressure with an evacuated pressure. The evacuated pressure may be a constant stored by the control unit 205, or it may be entered by the operator. If the first pressure is less than or equal to the evacuated pressure, the method will proceed to block 420. If the first pressure is greater than the evacuated pressure the method will return to block 405. In block 420, the method fills the batching tank 110 with one or more materials. After the method is finished filling the batching tank 110 with the one or more materials it proceeds to block 425, where it ends.

Figure 5:
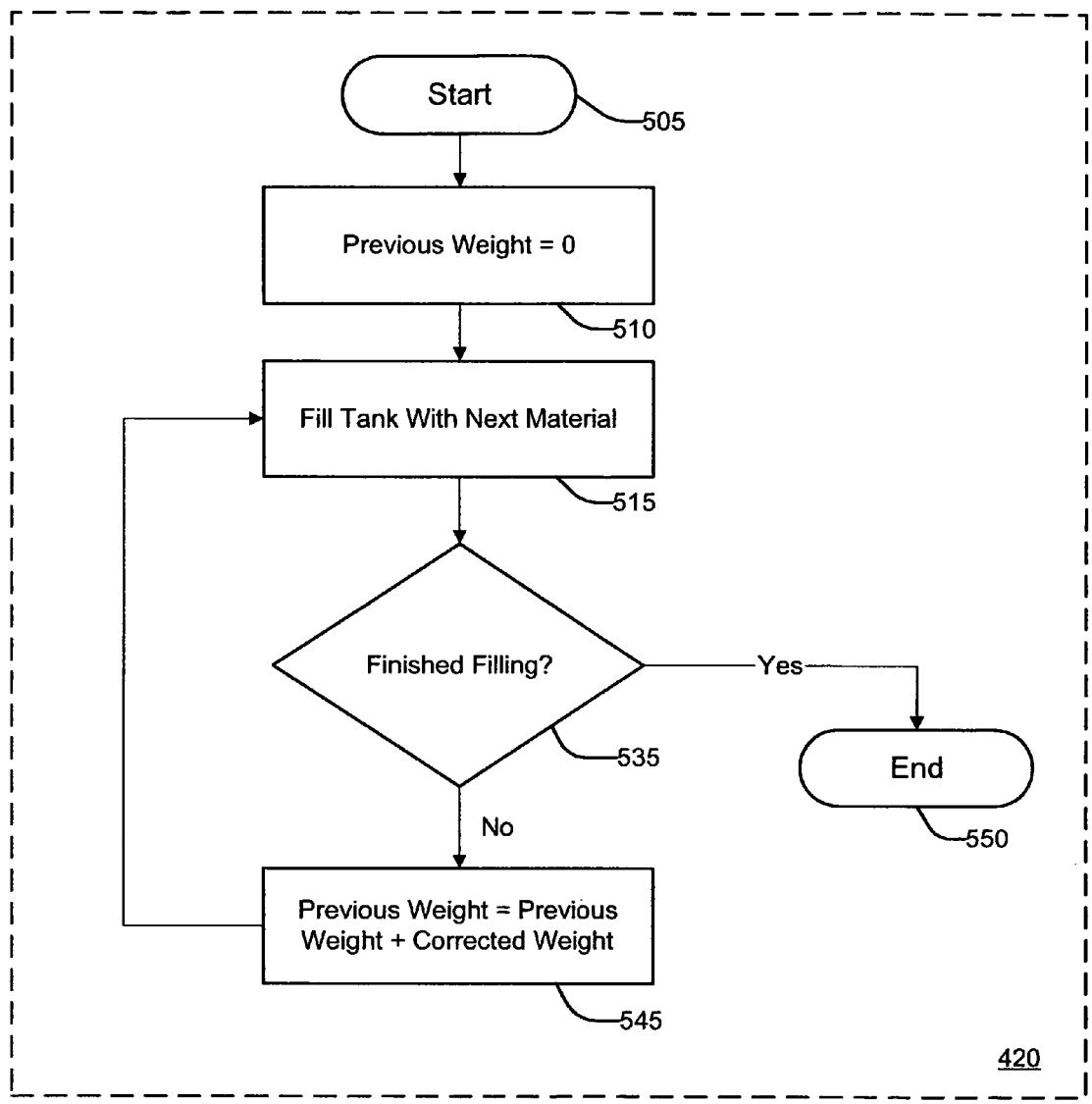
FIG. 5 is a flow chart of a method for dynamic vacuum bulk material transfer in accordance with the present invention.

Referring now to FIG. 5, block 420, in which the method of the present invention fills the batching tank 110, is shown in greater detail. The method begins at block 505. The method proceeds to block 510, where a previous weight is set to zero. In block 515 the method causes the batching tank 110 to be filled with a next material. In block 535, the method determines if the batching tank is suitably filled with a current material. If the batching tank 110 is finished filling with the one or more materials the method proceeds to block 550, where the method ends. If the batching tank 110 is not finished filling with the one or more materials the method proceeds to block 545. In block 545, the method increments the previous weight by a corrected weight of the batching tank 110.

Figure 6:
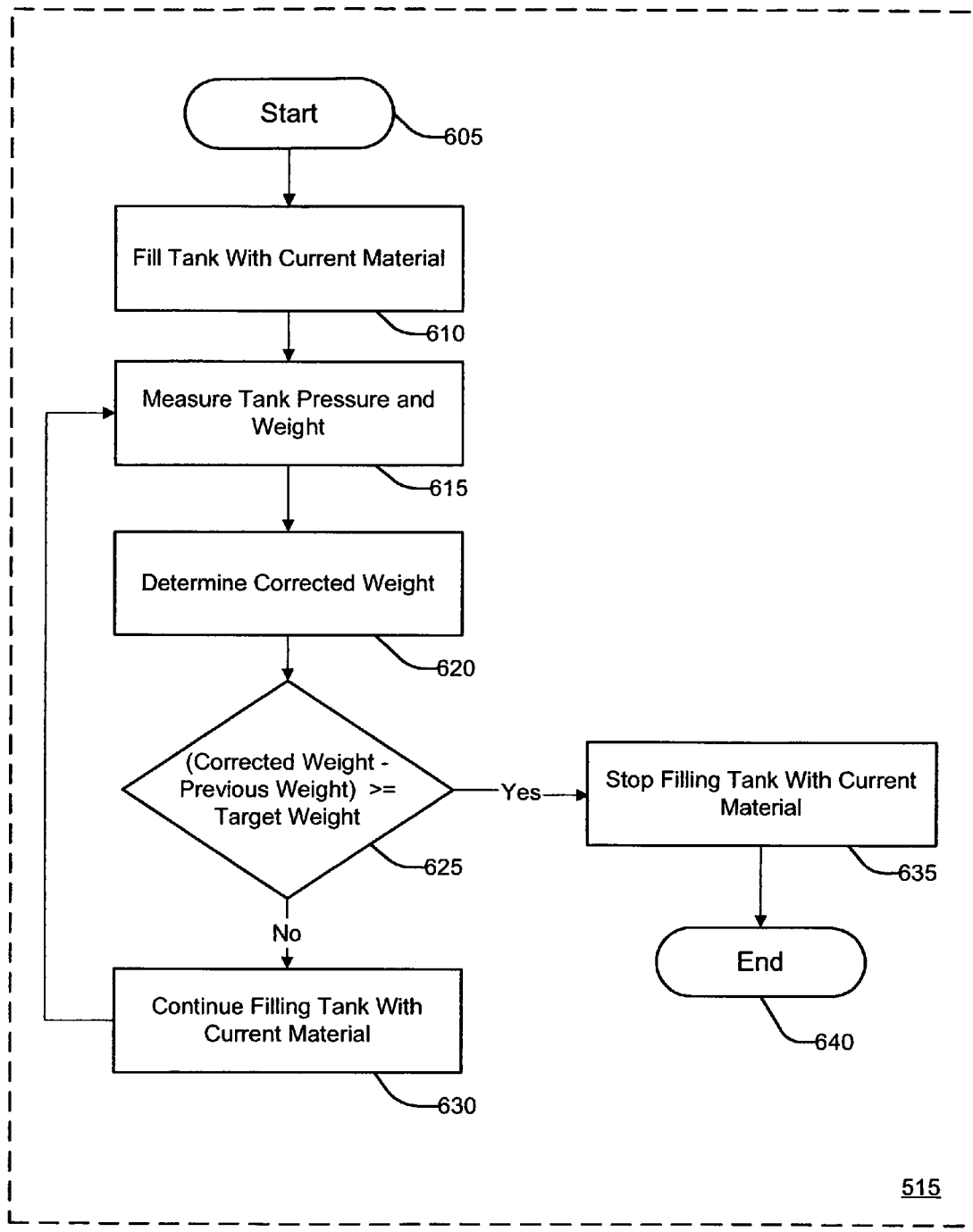
FIG. 6 is a flow chart of a method for dynamic vacuum bulk material transfer in accordance with the present invention.

Referring now to FIG. 6, block 515, in which the batching tank is filled with a next material is shown in greater detail. The method starts at block 605 and proceeds to block 610 where the batching tank 110 is filled with the current material. In one embodiment of the present invention, the control unit 205 operates one of the valves $125_{1...N}$, causing it to open, thus allowing material from one of the storage tanks $105_{1...N}$ to move into the batching tank 110. In another embodiment, the operator of the system manually operates one of the valves $125_{1...N}$. In block 615 the method measures a second weight of the batching tank 110 and a second pressure in the batching tank 110. In one embodiment, the control unit 205 receives the second weight from the weight measurement device 120 and the second pressure from the pressure measurement device 210. Alternatively, the readings from the weight measurement device 120 and the pressure measurement device 210 may be taken manually by the operator.

In block 620 the method determines the corrected weight of the batching tank 110. In one embodiment, the control unit 205 determines the corrected weight of the batching tank 110. The control unit 205 may use the following relationship to determine the corrected weight of the batching tank 110:

$$W_l = \sum_0^n W_{act_n} - \left[V_{TK} - \sum_0^n \frac{W_{act}}{\rho_{act_n}}\right](\rho_{gas_0} - \rho_{gas_{current}}),$$ (Equation 1)

In Equation 1, $W_1$ is the weight measured by the weight measurement device 120, n is the number of materials added to the batching tank 110, $W_{act_n}$ is an actual weight of the $n^{th}$ material added to the batching tank 110, $V_{TK}$ is a volume of the batching tank 110, $\rho_{act_n}$ is a density of the $n^{th}$ material added to the batching tank 110, $\rho_{gas_0}$ is a density of the fluid at atmospheric pressure, $\rho_{gas_{current}}$ is a density of the fluid at the second pressure. The relationship may be solved for $W_{act_n}$ by one skilled in the art with the benefit of this disclosure. The volume of the batching tank 110 may be stored in the control unit 205 as a constant, or it may be entered by the operator. The density of each of the n materials may be stored in the control unit 205 as constants or the densities may be entered by the operator. If the control unit 205 is operating the valves $125_{1...N}$ and knows the densities of the materials, then it can select the density for the $n^{th}$ material automatically. The density of the fluid at atmospheric pressure can be determined by the measurements of the first weights taken while the batching tank 110 was being evacuated. For example, the control unit 205 may divide the first weight, recorded while the batching tank 110 was at atmospheric pressure, by the volume of the batching tank 110. Alternatively, the density of the fluid at atmospheric pressure may be stored by the control unit 205 as a constant or entered by the operator. The density of the fluid at the second pressure may be determined by the measurements of first weights and first pressures, measured and recorded while the batching tank 110 was being evacuated.

In one embodiment, the control unit 205 may select the corresponding first weight and first pressure, where the first pressure is closest to the second pressure. Then, the control unit may divide the corresponding first weight by the corresponding first volume of the batching tank 110 to determine the density of the fluid at the second pressure. Alternatively, the control unit 205 may perform an interpolation of the recorded first weights and first pressures, producing a series of interpolated first weights and corresponding interpolated first pressures. This interpolation may use a straight line method, a least squares method, or another method, depending on the behavior of the system and the needs of the operator. The control unit 205 may then select an interpolated first weight, where the interpolated first weight corresponds to the interpolated first pressure that is closest to the second pressure. Then, the control unit may divide the corresponding interpolated first weight by the volume of the batching tank 110 to determine the density of the fluid at the second pressure. After determining the corrected weight, the method proceeds to block 625.

In block 620, the method may also calculate the corrected weight of the batching tank 110 without references to the first weights and first pressures. Rather, the method may use dynamic or steady-state fluid relationships to determine the density of the gas as the second pressure, and then solve for the corrected weight of the batching tank 110. An example equation that may be employed by the method is:

$$PV=mRT$$ (Equation 2)

Where P is the second pressure, V is the volume occupied by the fluid, m is the mass of the fluid in the batching tank 110 in number of moles, R is a constant (often referred to as a Universal Gas Constant) based on the units of measurement, and T is the temperature within the batching tank 110, which may be measured by a temperature measurement device, input by the operator, or assumed. One of ordinary skill in the art, with the benefit of this disclosure can solve for the density of the fluid based on Equation 2.

In block 625, the method determines if the corrected weight less the previous weight is greater than or equal to a target weight. The target weight may be stored in the control unit 205 as a constant or may be entered by the operator. If the corrected weight less the previous weight is not greater than or equal to the target weight the method proceeds to block 630, where the method continues to fill the batching tank 110 with the current material and returns to block 615. If the corrected weight less the previous weight is greater than or equal to the target weight the method proceeds to block 635 where the method stops filling the batching tank 110 with the current material and proceeds to block 640 where the method ends.

In block 635 the method will halt the flow of material to the batching tank 110. This may be accomplished by the control unit 205 closing all of the valves $125_{1...N}$ that are open by sending a control signal to the valves $125_{1...N}$. Alternatively, the operator may manually close the valves $125_{1...N}$ that are open. Additionally, the method may transfer the material in the batching tank 110 to the destination vessel 115.

Figure 7:
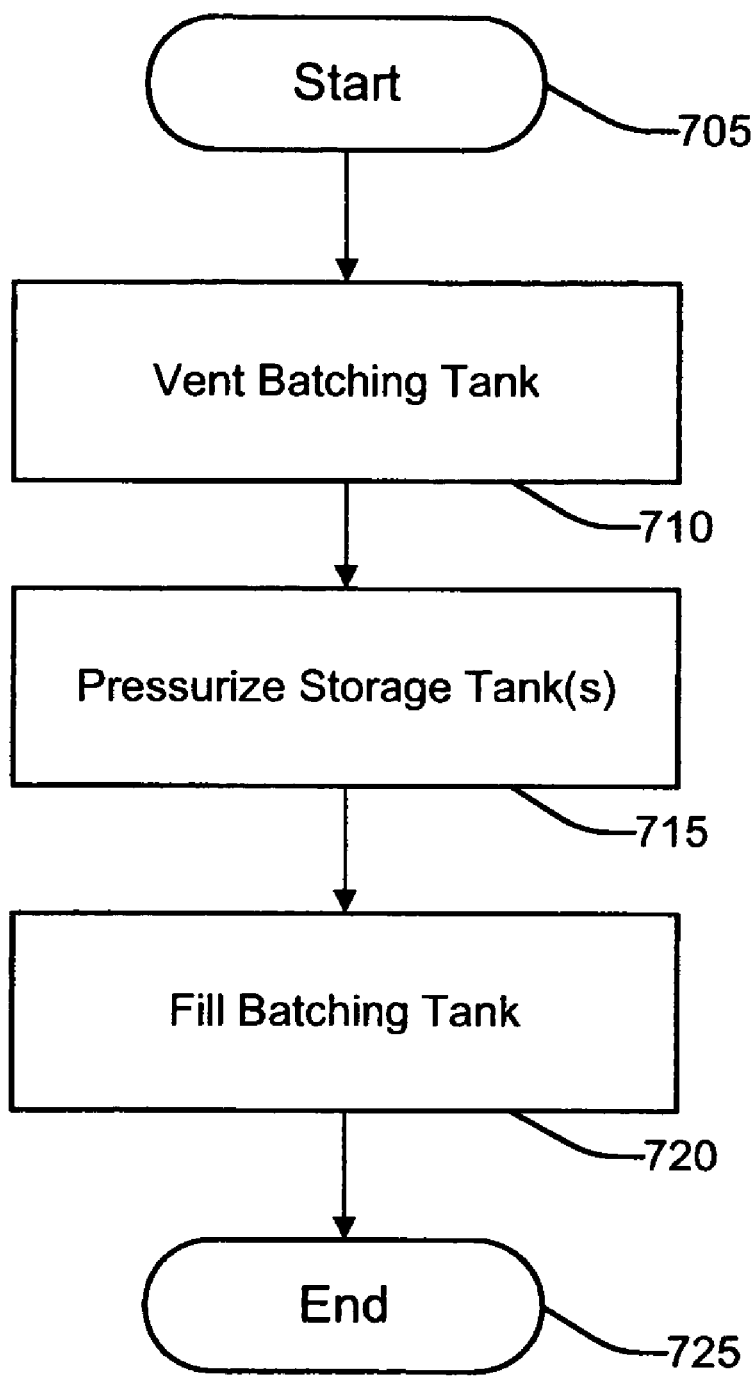
FIG. 7 is a flow chart of a method for bulk material transfer in accordance with the present invention.

Turning now to FIG. 7, a method of operation of the system 300 according to the present invention will be described. The method starts at block 705 and proceeds to block 710, where the batching tank 110 is vented. In block 715 the method of the present invention causes one or more of the storage tanks $105_{1...N}$ to be pressurized. In block 720 the method of the present invention fills the batching tank 110 with one or more materials from one or more of the storage tanks $125_{1...N}$. In block 725 the method of the present invention ends.

Figure 8:
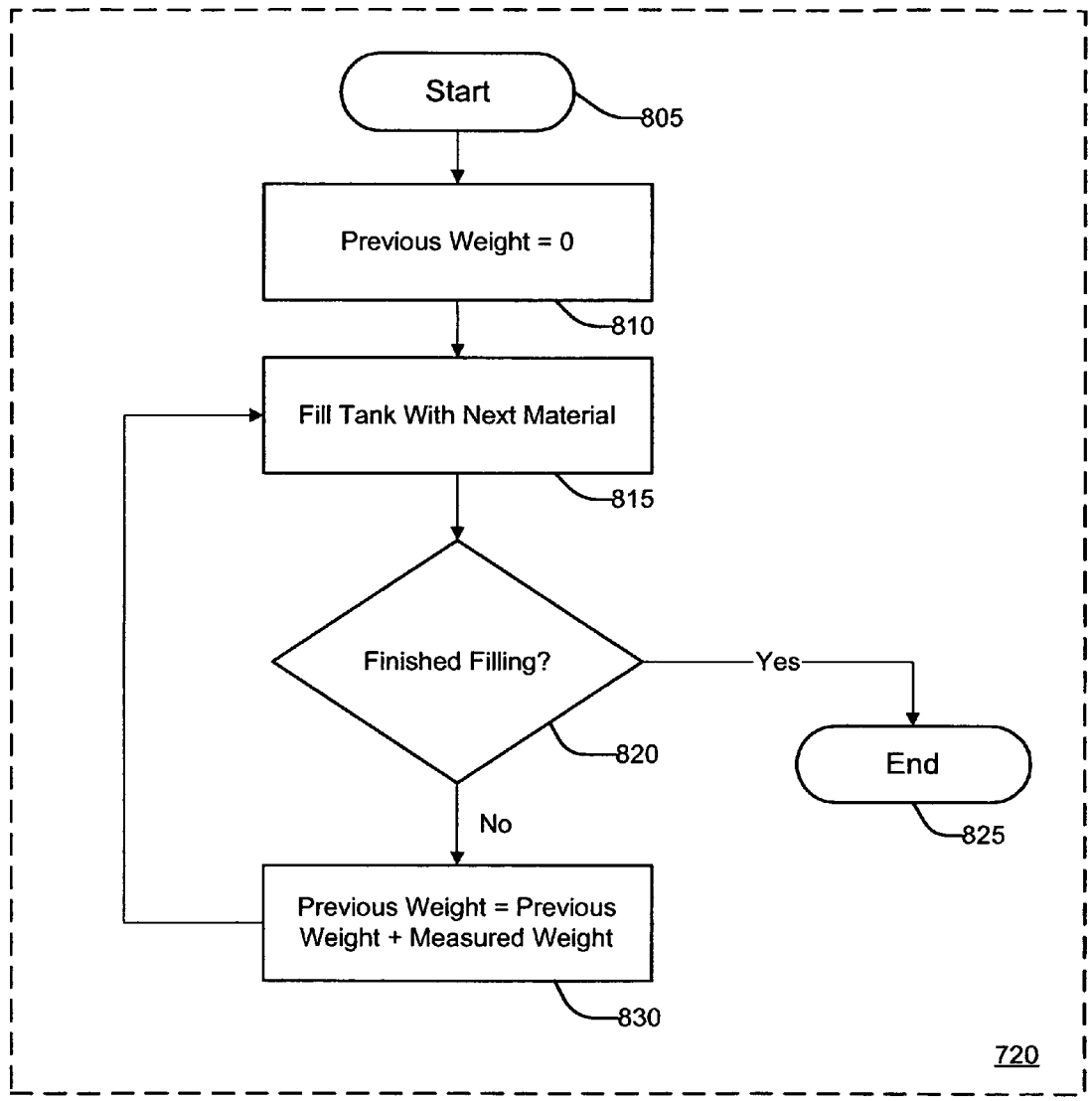
FIG. 8 is a flow chart of a method for bulk material transfer in accordance with the present invention.

Referring now to FIG. 8, block 720, in which the method of the present invention fills the batching tank 110, is shown in greater detail. The method begins at block 805. The method proceeds to block 810, where a previous weight is set to zero. In block 815 the method causes the batching tank 110 to be filled with a next material. In block 820, the method determines if the batching tank is suitably filled with a current material. If the batching tank 110 is finished filling with the one or more materials the method proceeds to block 825, where the method ends. If the batching tank 110 is not finished filling with the one or more materials the method proceeds to block 830. In block 830, the method increments the previous weight by the measured weight of the batching tank 110.

Figure 9:
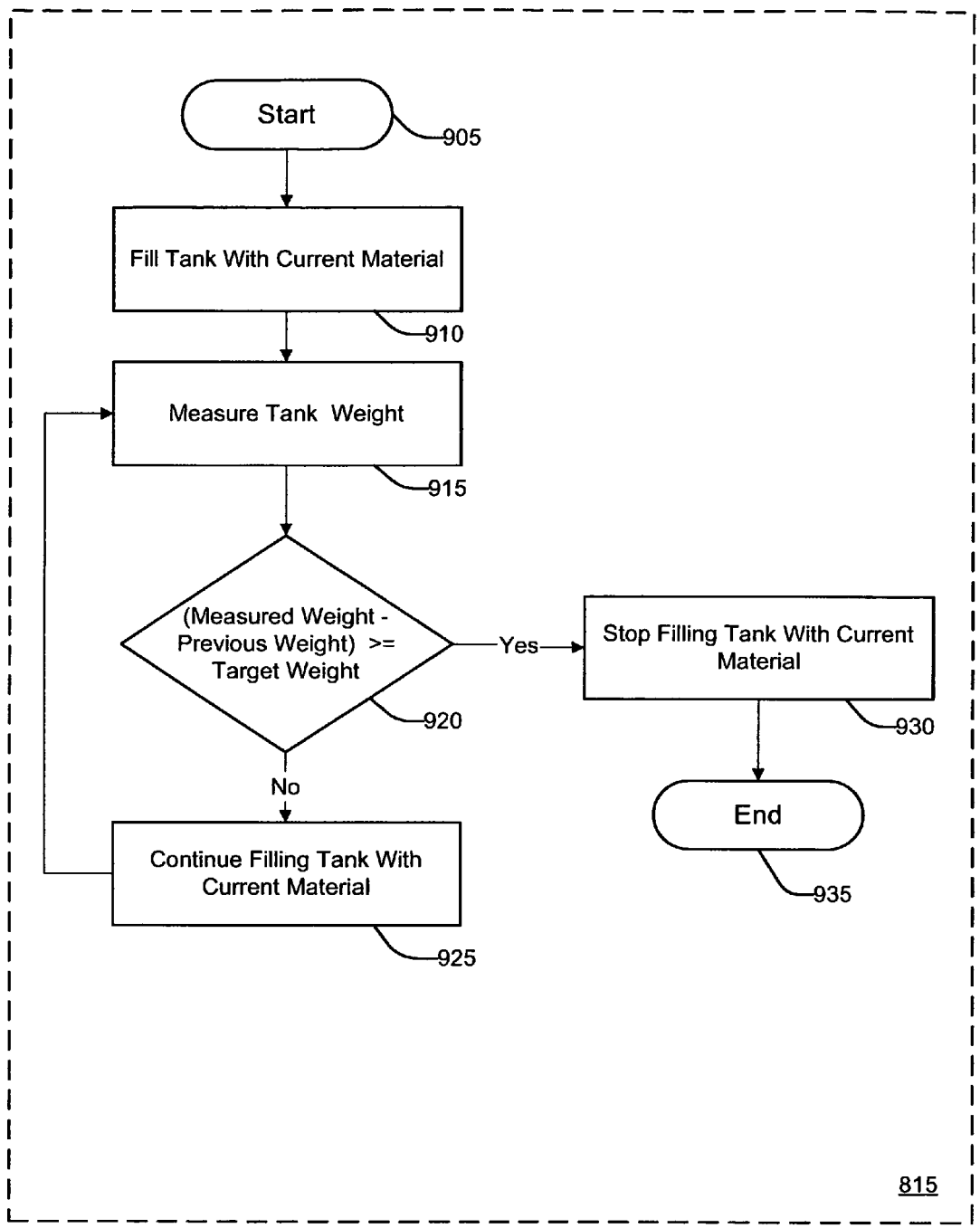
FIG. 9 is a flow chart of a method for bulk material transfer in accordance with the present invention.

Referring now to FIG. 9, block 815, in which the method of the present invention fills the batching tank 110 with the next material, is shown in greater detail. The method starts at block 905 and proceeds to block 910 where the batching tank is filled with the current material. In one embodiment of the present invention, the control unit 205 operates one or more of the valves $125_{1...N}$, causing them to open, thus allowing material from one or more of the storage tanks $105_{1...N}$ to move into the batching tank 110. The control unit 205 may also operate one or more of the pumps $302_{1...N}$, causing one or more of the pumps to pressurize one or more of the storage tanks $105_{1...N}$, forcing material stored in the pressurized storage tanks to move into the batching tank 110. In another embodiment, the operator of the system manually operates one or more of the valves $125_{1...N}$. In block 920, the method determines if the measured weight less the previous weight is greater than or equal to the target weight. The target weight may be stored in the control unit 205 as a constant or may be entered by the operator. If the corrected weight less the previous weight is not greater than or equal to the target weight the method proceeds to block 925, where the method continues to fill the batching tank 110 with the current material and returns to block 915. If the corrected weight less the previous weight is greater than or equal to the target weight the method proceeds to block 930 where the method stops filling the batching tank 110 with the current material and proceeds to block 935 where the method ends.

In block 930 the method will halt the flow of material to the batching tank 110. This may be accomplished by the control unit 205 closing the one of the valves $125_{1...N}$ that is open by sending a control signal to the valves $125_{1...N}$. Alternatively, the operator may manually close the one of the valves $125_{1...N}$ that is open. The control unit 205 may also operate one of the pumps $302_{1...N}$, causing the pumps $302_{1...N}$ to stop pressurizing the storage tanks $105_{1...N}$. Additionally, the method may transfer the material in the batching tank 110 to the destination vessel 115.

Figure 10:
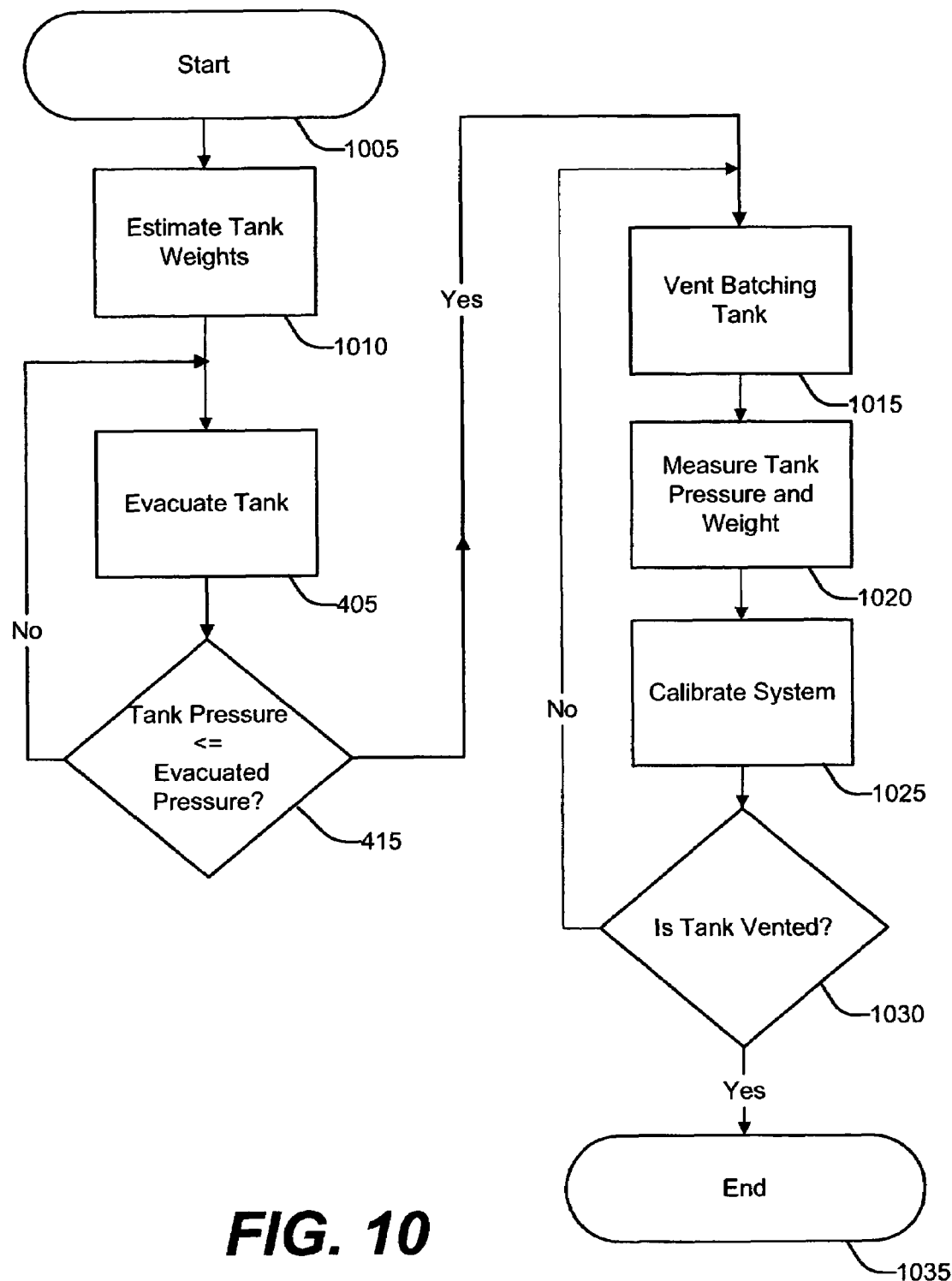
FIG. 10 is a flow chart of a method for calibrating a system in accordance with the present invention.

Turning now to FIG. 10, a method of calibration of the system 200 according to the present invention will be described. The method starts at block 1005 and proceeds to block 1010, where the method estimates the weight of the batching tank 110 at a series of pressures based on assumptions, operator inputs, and equations such as Equations 1 and 2 described above. In block 405 (as described with respect to FIG. 4), the method evacuates the batching tank 110. In block 415 the method determines if the pressure in the batching tank 110 is less than or equal to the evacuated pressure, as described with respect to FIG. 4. If the pressure in the batching tank 110 is less than or equal to the evacuated pressure the method proceeds to block 710. If the pressure in the batching tank 110 is greater than the evacuated pressure the method returns to block 405. In block 1015, the method of the present invention vents the batching tank 110. The control unit 205 may open vents on the batching 110 to vent the batching tank 110. In block 1020 the method measures the pressure and weight of the batching tank 110. The control unit 205 may obtain the weight measurement from the weight measurement device 120 and the pressure from the pressure measurement device 210. In block 1025 the method compares the measured pressures and weights with those calculated in block 1010. If the estimated weight at the measured pressure is not equal to the measured weight at the measured pressure, the control unit 205 may adjust the calibration of the weight measurement device 120 or other portions of the system 200 so that the estimated weight at the measured pressure will equal the measured weight at the measured pressure. In block 1030 the method determines if the batching tank is fully vented. The control unit 205 may determine if the batching tank 110 is fully vented by comparing the measured pressure with atmospheric pressure. If the measured pressure is below atmospheric pressure the control unit will determine that the batching tank 110 is not fully vented. If the batching tank 110 is fully vented the method proceeds to block 1035, where it ends.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A material transfer system for transferring a material to a batching tank, the batching tank having a weight, a pressure, and a volume, the batching tank initially comprising a fluid, the fluid having a density, the material having a density, the system comprising:
   a vacuum pump, the vacuum pump removeably connected to the batching tank and operable to remove fluid from the batching tank;
   a weight measurement device operable to measure one or more first weights of the batching tank and a second weight of the batching tank, the weight measurement device having an output;
   a pressure measurement device operable to measure one or more first pressures in the batching tank and a second pressure in the batching tank, the pressure measurement device having an output;
   one or more valves for allowing the material to enter the batching tank, each valve having a control input; and
   a control unit in communication with the output of the weight measurement device and the output of the pressure measurement device, the control unit operable to record one or more first weights measured by the weight measurement device and one or more first pressures measured by the pressure measurement device, and the control unit operable to determine a corrected weight;
   wherein the control unit is operable to:
   receive one or more first weights from the weight measurement device;
   receive one or more first pressures from the pressure measurement device;
   operating one of the valves, causing material to be transferred to the batching tank;
   receive a second weight from the weight measurement device, wherein the second weight
   is determined while material is being transferred into the batching tank;
   receive a second pressure from the pressure measurement device, wherein the second pressure is measured substantially simultaneously with measurement of the second weight; and
   determine a corrected weight based on the second weight, the second pressure, one or more first weights, one or more first pressures, and one or more material properties.

2. The material transfer system according to claim 1 wherein the control unit is operable to:

determine a volume occupied by the fluid;
determine a volume occupied by the material;
determine a fluid weight by multiplying the volume occupied by the fluid by the density of the fluid;
determine a material weight by multiplying the volume occupied by the material by the density of the material; and
determine the corrected weight by adding the material weight and the fluid weight.

3. The material transfer system according to claim 1 wherein the control unit is operable to:
select a first weight, wherein the first weight was measured substantially simultaneously with the closest first pressure, and wherein the closest first pressure is nearest the second pressure; and
calculate the density of the fluid by dividing the selected first weight by the volume of the batching tank.

4. The material transfer system according to claim 1 wherein the control unit is operable to close one of the valves to halt material from flowing into the batching tank.

5. The material transfer system according to claim 1 wherein the control unit is operable to:
log the one or more first weights, wherein each first weights are measured while the fluid is removed from the batching tank; and
log the one or more first pressures, wherein each first pressure is measured substantially simultaneously with the measurement of the first weight.

6. The material transfer system according to claim 4 wherein the control unit is operable to close one of the valves to halt the flow of material when the corrected weight is near a target weight.

* * * * *